United States Patent
Ross

[11] Patent Number: 5,784,825
[45] Date of Patent: Jul. 28, 1998

[54] DISSOLUBLE FISHING SINKER

[76] Inventor: Nadine Ross, 4869 Hwy. 395 N., Kettle Falls, Wash. 99141

[21] Appl. No.: 629,935
[22] Filed: Apr. 12, 1996
[51] Int. Cl.⁶ .................................................. A01K 95/00
[52] U.S. Cl. .......................................... 43/43.12; 43/43.14
[58] Field of Search ................................. 43/43.12, 43.14

[56] References Cited

U.S. PATENT DOCUMENTS

| | | | |
|---|---|---|---|
| 2,308,238 | 1/1943 | Baker | 43/52 |
| 2,754,614 | 7/1956 | Yakel | 43/43.12 |
| 3,029,544 | 4/1962 | Dimatteo | 43/43.12 |
| 3,081,574 | 3/1963 | Wise | 43/43.12 |
| 3,393,467 | 7/1968 | Potter et al. | 43/43.12 |
| 3,405,476 | 10/1968 | Pumilio | 43/43.12 |
| 3,415,005 | 12/1968 | Gilham | 43/43.12 |
| 3,685,196 | 8/1972 | Scott | 43/43.12 |
| 3,834,059 | 9/1974 | Overstreet | 43/43.12 |
| 3,854,235 | 12/1974 | Thompson | 43/43.12 |
| 4,286,403 | 9/1981 | Rogers | 43/43.12 |
| 4,501,083 | 2/1985 | Ong | 43/4.5 |
| 4,663,881 | 5/1987 | Follett | 43/43.12 |
| 5,157,860 | 10/1992 | Clark | 43/43.12 |
| 5,243,779 | 9/1993 | Reed | 43/43.12 |

Primary Examiner—Michael J. Carone
Assistant Examiner—Darren Ark
Attorney, Agent, or Firm—Keith S. Bergman

[57] ABSTRACT

An annular fishing sinker is formed of environmentally compatible materials to dissolve in variable predetermined times in a water environment. The sinker is formed of sand in a matrix of gelatin, particulated cellulosic material that swells in water and unbleached wheat flour with enough water to form a moldable plastic mixture that upon drying is coherent and configurationally sustaining. The components may be varied in relative quantity to provide sinkers that dissolve in from less than one minute to more than twenty minutes. The sinker is attached to a fishing line by tying in such fashion that a knot will not be left in a supporting line when the sinker dissolves. A process is disclosed for forming the sinker by molding with subsequent drying.

3 Claims, 1 Drawing Sheet

DISSOLUBLE FISHING SINKER

II. BACKGROUND OF INVENTION

IIA. Related Applications

There are no applications related hereto heretofore filed in this or any foreign country.

IIB. Field of Invention

This invention relates generally to fishing sinkers and more particularly to an annular water dissoluble sinker formed of environmentally compatible material.

IIC. Background and Description of Prior Art

Sinkers of various sorts have long been used in fishing to sink fishing apparatus, baits and lures in water and to aid casting of light lines and their attachments. Commonly in the past such sinkers have been formed of metal and particularly lead which is not an environmentally desirable material and in some areas is banned from use in fishing. With present day environmental awareness and concern, it has become increasingly desirable to form fishing sinkers from environmentally friendly and compatible materials and responsively fishing sinkers composed of such materials have become known.

In some activities involved with various forms of sport fishing, such as in providing weight for casting light lines and attachments, in allowing free bait motion or in fishing in areas where a sinker rests on the bottom of a water course where it commonly becomes snagged or entangled, it is desirable to provide a sinker that is released or removed from a line after the sinker has been in a water environment for a period of time. Responsive to this need, releasable and removable sinking devices have heretofore become known, though they have not become particularly popular or well accepted in the fishing arts primarily because of unsolved problems associated with them.

The instant invention seeks to lessen or resolve these problems while at the same time providing a sinker that is formed entirely from environmentally friendly and compatible materials.

Known sinkers embodying dissoluble material may be divided broadly into two classes, a first class encompassing sinkers that have some type of a release mechanism with an associated dissoluble element that upon appropriate disintegration causes the release of a coherent sinker body from a fishing line with or without part of the release mechanism remaining and a second class wherein the sinker structure itself is dissoluble to disintegrate into its component elements upon dissolution.

The first class of devices wherein some part of the sinker fixture remains fastened to a fishing line is epitomized by U.S. Pat. Nos. 3,405,476; 2,308,238; and 3,081,574. Such devices are readily distinguished from the instant invention in that the instant sinker is totally dissoluble and does not leave any part or portion on a carrying line upon dissolution of the dissoluble member. Another type of sinker of this class is represented by U.S. Pat. No. 3,685,196 wherein some non-dissoluble, coherent sinker element is interconnected to a fishing line by a dissoluble connector link so that the sinker element is released from the line upon dissolution of the connector link. This type of sinker again is readily distinguishable in that the sinker that is released from the line remains in the environment in its original form and is not dissoluble or readily decomposed into its component elements as is the sinker of the instant invention.

The second class of dissoluble sinkers such as that disclosed in U.S. Pat. No. 3,393,467 provides a sinker element that is completely dissoluble so that nothing remains on a line after dissolution, but rather the sinker is decomposed into its elemental factions which are dispersed to reside in the environment. Another somewhat similar dissoluble sinker is disclosed in U.S. Pat. No. 4,663,881 where the sinker element, except for an interconnecting flexible thread or string, is dissoluble. The instant invention is an improved member of this class of sinkers.

My sinker differs from known members of its class firstly, by reason of its annular shape. The known prior dissoluble sinkers have not been formed with a hole defined through the sinker itself so that a fishing line may not be passed through the sinker for fastening, but rather those prior sinkers have provided some type of auxiliary fastening structure such as a string or thread or have required that a supporting fishing line be fastened by wrapping and knotting about the exterior surface of the sinker. Auxiliary fastening devices used in prior sinkers have not generally been biodegradable and have added additional undesirable debris to the environment upon sinker disintegration. Sinkers that have particular surface configuration to allow fastening of a fishing line by wrapping are more difficult to use and often do not securely fasten a sinker to a fishing line so that it may become disengaged therefrom prior to dissolution of the sinker.

My hole defining sinker provides an additional benefit in that it may be fastened securely and absolutely by particular knots that disappear when the sinker dissolves and do not form a knot in the fishing line. In general with sinkers that are fastened to a fishing line by wrapping the line about the sinker periphery, a secure and absolute attachment may not be made except by creating a knot that after sinker disintegration will remain as a knot in the fishing line that either requires removal in the future or substantially weaken the strength of the line if not removed.

My sinker further differs from other members of its class by reason of the materials from which it is formed, and particularly the inclusion of particulate swellable cellulosic material as a component. Prior environmentally friendly dissoluble sinkers have disclosed the use of earth materials including both sand and soil adhered by an adhesive matrix, generally a hydrolized starch and especially corn starch. I have found that such material generally is not completely homogeneous and has no uniform nor rapid dissolution. In distinction, my sinkers are formed of sand with a gradiational particle size combined with particulated water swellable cellulosic material and unhydrolized wheat flour in a hydrolyzed gelatin matrix. This matrix material presents not only a soluble binding agent, but the particulated cellulosic material and flour provide components that swell in the presence of water to aid the disintegration process, both by physically breaking adhesive bonds and by providing channels in the matrix material through which water may more easily and uniformly pass. The disintegration process is further aided by the annular shape of my sinker which presents a larger surface area for water penetration than other prior geometric shapes for sinkers of the same type that are of equal volume.

The material from which my sinker is formed provides a secondary advantage in that it allows the formation of sinkers that dissolve at various predeterminable times merely by varying the amounts of components of the sinker composition relative to each other. This allows the production of sinkers that disintegrate in a water environment in twenty seconds or less to sinkers that do not disintegrate for more than twenty to thirty minutes. The disintegration is quite uniform and reproduceable in sinkers having the same composition. Such difference in time of sinker disintegration is desirable in various fishing endeavors so that a rapidly disintgrating sinker may be used when the purpose of the sinker is to provide weight for casting, but a much more slowly disintegrating sinker may be used when the purpose is to maintain bait at a depth for some period of time without having the sinker snag on an underwater surface or object.

My invention resides not in any one of these features individually, but rather in the synergistic combination of all of the components and structures of my invention which necessarily give rise to the functions flowing therefrom.

III. SUMMARY OF INVENTION

My invention provides a dissoluble fishing sinker formed of materials that do not contaminate the environment upon dissolution. The sinker is configured as a truncated conic annulus to allow formation by molding, and is formed of a mixture of sand particles adhered by a matrix of particulated cellulosic material, wheat flour and gelatin mixed with enough water to allow formation by molding. The mixture of matrix materials may be varied to allow times required for sinker disintegration in water varying from about twenty seconds to more than about twenty minutes. The hole defined through the sinker allows fastening to a fishing line by knotting to provide absolute and secure fastening that upon sinker dissolution does not leave a knot in the supporting fish line. Various known fish attracting materials may be added to the sinker.

In providing such a product, it is:

A principal object to provide a fishing sinker formed of sand and dissoluble matrix material that is of an environmentally non-polluting nature.

A further object is to provide such a sinker that is configured as an annular truncated conic with a medial hole defined therethrough to allow attachment to the end portion of a fishing line by knotting that does not leave a knot in the line after sinker dissolution.

A further object is to provide such a sinker that has binding matrix material formed of a mixture of swellable particulated cellulosic material, wheat flour and hydrolized gelatin to provide uniform dissolution and disintegration of the sinker material throughout its mass.

A still further object is to provide such a matrix material wherein the relative proportions of cellulosic material, flour and gelatin may be varied relative to each other to provide sinkers of normally desired weights that disintegrate at predetermined times ranging from less than twenty seconds to more than twenty minutes.

A still further object is to provide such sinkers that may be formed in an open cavity mold with subsequent air drying to a configurationally maintaining coherent state.

A still further object is to provide such a sinker that is of new and novel design and composition, of rugged and durable nature, of simple and economic manufacture and otherwise well suited to the uses and purposes for which it is intended.

Other and further objects of my invention will appear from the following specification and accompanying drawings which form a part hereof. In carrying out the objects of my invention, however, it is to be remembered that its accidental features are susceptible of change in design and structural arrangement, with only one preferred and practical embodiment of the best known mode being illustrated in the drawings and described in the specification as required.

IV. BRIEF DESCRIPTION OF DRAWINGS

In the accompanying drawings which form a part hereof and wherein like numbers of reference refer to similar parts throughout:

V. DESCRIPTION OF PREFERRED EMBODIMENT

Figure 1:
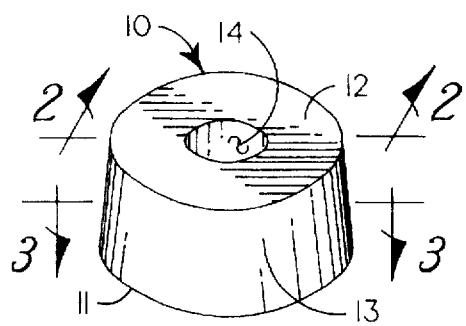
FIG. 1 is an isometric surface view of a sinker of my invention, showing its configuration.
Figure 3:
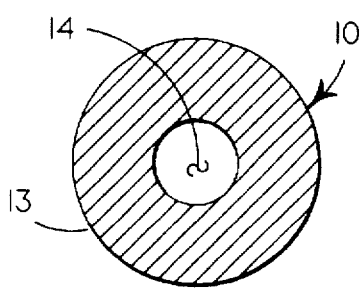
FIG. 3 is a medial horizontal cross-sectional view of the sinker of FIG. 1, taken on the line 3—3 thereon in the direction indicated by the arrows.
Figure 2:
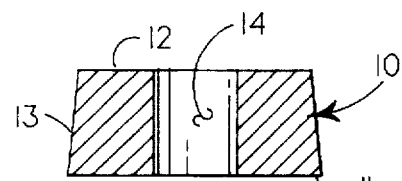
FIG. 2 is a medial cross-sectional view of the sinker of FIG. 1, taken on the line 2—2 thereon in the direction indicated by the arrows.

My sinker 10 configurationally comprises a truncated right conic with larger circular base 11 interconnecting smaller circular top 12 by conic surface 13. Circularly cylindrical hole 14 is defined in the medial portion of sinker 10, preferably with its axis coincident with the axis of the conic surface 13. The size and relative dimensioning of my sinker is not critical so long as the sinker defines a volume to embody sufficient material to provide a desired weight and defines a cylindrical hole through which the end of a loop of fishing line that is to carry the sinker may be inserted. The primary purpose of the conic surface 13 of the sinker is to aid formation by molding in an open end mold by allowing easier release and providing means for forceful release if necessary. Normally the included angle of the conic side 13 with base 11 will be eighty to ninety degrees. Preferably for general purposes, my sinker should have a configuration substantially as illustrated. A sinker of such configuration formed with the composition of my invention with a top of $^{11}/_{16}$ inch diameter, a bottom of ¾ inch diameter, a height of ½ inch and a hole of ¼ inch diameter will include material having a dry weight of approximately ½ ounce.

The material from which my sinker is formed comprises sand grains bonded together by a matrix material formed of a mixture of particulated cellulosic material of vegetative origin, wheat flour and an aqueous solution of animal gelatin that is plasticized with water, molded in plastic form and air dried to a hard, configurationally sustaining coherent object.

The sand used in my sinker is a washed river sand of a medium to fine nature that will pass a ten mesh screen leave very little, if any, material on a two hundred mesh screen, with a distribution of sufficiently smaller particulated grains to form a compact mass having density of approximately seventy to eighty percent of the density of the material forming the sand grains. Such sand normally will be a type of argillaceous silicate material and preferably has a density approaching that of silica. A typical laboratory sieve analysis of the sand I use in my sinker according to ASTM-136 is as set forth in Table 1.

TABLE 1

| Screen Size Number | Percent of Material Passing |
| --- | --- |
| 10 | 100 |
| 16 | 100 |
| 30 | 99 |
| 40 | 89 |
| 100 | 6 |
| 200 | 0.3 |

The cellulosic material used in my binder preferably is a proprietary product known as "Solka-Floc" Grade 200 FCC manufactured and merchandised by Fiber Sales and Development Corporation of Greenbrook, N.J. This product is a dry powdered cellulose derived from vegetative fiber that has an average length of approximately thirty-five microns, a bulk volume of 2.1 to 2.6 cubic centimeters per gram and a water absorption of approximately 400 grams per 100 grams of product. The material is merchandised primarily as a food product additive. A screen analysis of the particulated product indicates that none remains on a thirty-five mesh screen, ninety-three to one hundred percent remains on a one hundred mesh screen and substantially all remains on a two hundred mesh screen. This particular proprietary product is not essential to my invention, however, and other powdered cellulosic materials of a similar nature having similar physical and chemical characteristics may be used in my binding matrix.

The flour used in my matrix mixture is common unbleached wheat flour, generally merchandised for "all purpose" use. Many of the "all purpose" flours merchandised in present day commerce have been found usable in my matrix material and there seems to be little, if any, distinction between them.

The gelatin as used in my matrix is an ordinary food grade gelatin of present day commerce as used in various comestible products. The gelatin is used in an aqueous solution consisting of one-half ounce of dry powdered gelatin admixed with one quart of water until the gelatin is completely hydrated and the mixture is homogeneous. This particular mixture will hereinafter be referred to as "gelatin solution". The particular gelatin used in the examples set forth herein was a product sold by Knox Gelatin, Inc., of Englewood Cliffs, N.J. as "unflavored gelatin" but other animal gelatins of a similar nature are operative with my invention.

Examples of mixtures from which my sinkers may be formed are as follows:

Example 1

| Component | Parts by Volume |
| --- | --- |
| Sand | 4 |
| Solka-Floc | 1.33 |
| Wheat flour, unbleached | 0.67 |
| Gelatin Solution (Knox) | 2.67 |

The sand, Solka-Floc and flour are mixed until well blended. The fluidic gelatin solution is added and the mixture blended for approximately two minutes until it is substantially homogeneous. The resulting product will behave somewhat similarly to plastic concrete and will separate liquid on its upper surface portion upon standing. Before use, the material should be remixed to maintain substantial homogeneity at the time of molding.

Figure 4:
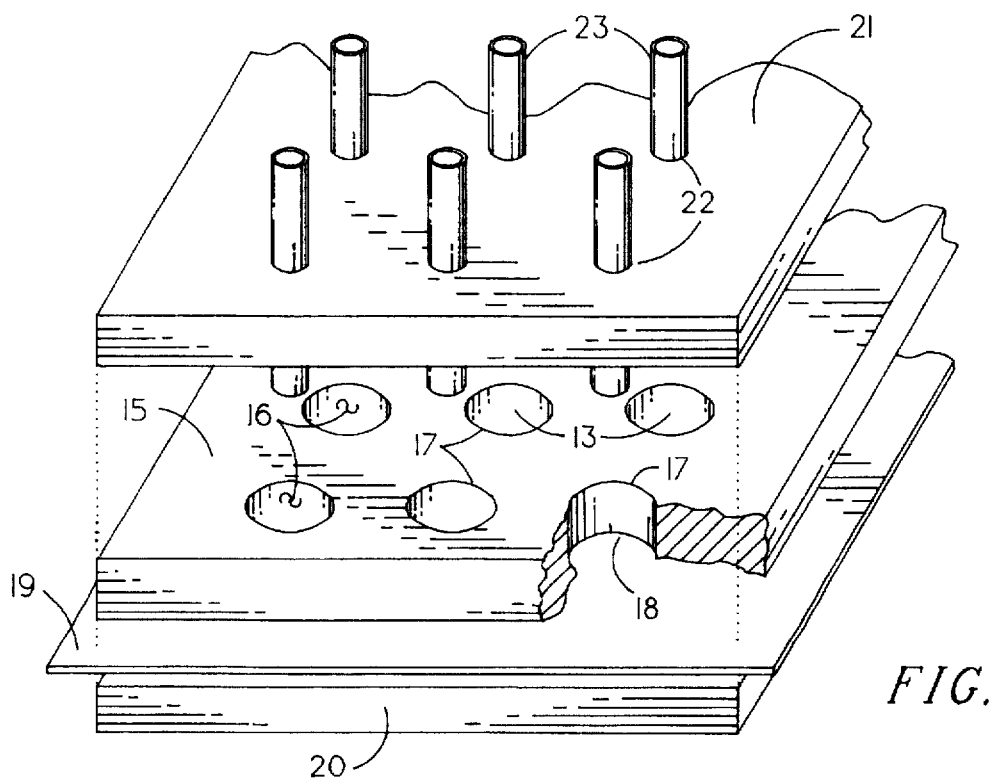
FIG. 4 is an expanded partial isometric view of an open top mold structure in which my sinkers may be formed.

This mixture is molded in open surface mold 15 shown in FIG. 4. The mold is a flat planar structure defining a plurality of molding cavities 16 each defining the conic surface 13 of a sinker and having larger upper orifice 17 to form the base of a sinker and diametrically smaller bottom 18 to form the truncated top portion of a sinker. Mold 15 is supported on plastic release sheet 19 carried on the upper surface of flat base 20. The three molding elements are positioned in vertical adjacency and cavities 16 are filled with the homogeneous plastic mixture forming my sinker. The mold is jigged to remove entrapped air and assure filling and surplus material is removed from the upper surface of the mold by a flexible bladed squeegee. The molded sinker mixture is allowed to set for approximately thirty minutes to allow initiation of the setting process.

Hole plate 21 is of the same peripheral configuration as mold 15 and defines a plurality of orifices 22, arrayed and aligned so that their axes are coincident with the axes of the truncated conic cavities 16 of mold 15, extending through the hole plate. Each orifice 22 carries a tube 23 of such external diameter as to define cylindrical hole 14 in each sinker. Preferably, though not necessarily, the tubes 23 comprise ordinary beverage drinking straws of commerce formed of water impervious material. The tubes 23 are positionally maintained by frictional engagement within orifices 22 so as to allow the tubes to be disposable after use. It is possible to use metallic or other types of tubes, but if this is done and the tubes are not expendable, material accumulated in the interior channel of the tubes must be removed for reuse of the tubes and this may be a difficult process.

After the molded sinkers have set approximately thirty minutes, the tube plate 21 is placed over mold 15 and the tubes 23 are moved in a downward and rotary fashion, if necessary, to extend to the upper surface of release sheet 19. The mold 15 is then air dried in this condition for approximately twelve hours.

The tubes 23 then are again rotated and moved downwardly, if necessary, to assure that they extend through the mold cavity to the upper surface of release sheet 19. The mold is then again air dried for approximately eight hours, whereupon the tubes are removed from the sinkers and the tube plate is removed from the mold. The mold is then air dried for approximately twelve hours.

The mold is then turned upside down, removed from release sheet 19 and air dried for approximately twenty-four hours until the molded sinkers may be removed from the mold by manual pressure. After removal from the mold, the sinkers are air dried for approximately three days when they are ready for use. All air drying is at room temperatures of approximately 68–72 degrees F.

Sinkers formed in this fashion soften and disintegrate sufficiently to separate from a line to which they are tied in approximately thirty seconds after immersion in water.

Example 2

| Component | Parts by Volume |
| --- | --- |
| Sand | 4.25 |
| Solka-Floc | 0.50 |
| Wheat flour, unbleached | 0.75 |
| Gelatin Solution (Knox) | 1.50 |
| Water | 0.675 |

Sinkers formed of this mixture and processed according to the procedure described in Example 1 will dissolve sufficiently to separate from a fishing line fastened thereto in approximately three minutes after immersion in water.

Example 3

| Component | Parts by Volume |
|---|---|
| Sand | 4 |
| Solka-Floc | 0.25 |
| Wheat flour, unbleached | 1.0 |
| Gelatin Solution (Knox) | 1.875 |
| Water | 0.175 |

Sinkers formed of this mixture and processed according to the procedure described in Example 1 will soften and dissolve sufficiently to separate from a fishing line attached thereto in approximately twenty minutes after immersion in water.

Various intermediate mixtures of the components of my sinker composition will provide dissolution and disintegration times ranging between the times set forth in the three examples, with disintegration times not varying particularly lineally with the proportions of materials used in the mixture.

Figure 5:
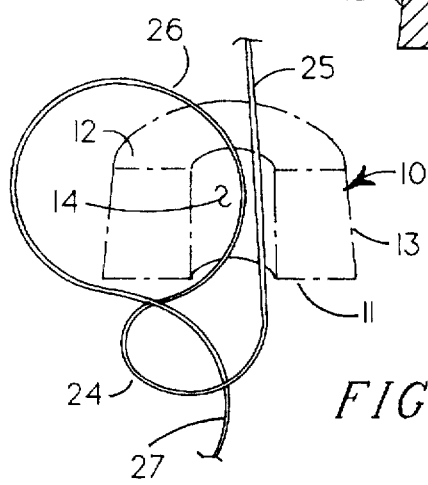
FIG. 5 is a somewhat diagrammatic isometric view of a simple knot with which my sinker may be attached to a fishing line without causing a knot in the line after sinker disintegration.
Figure 6:
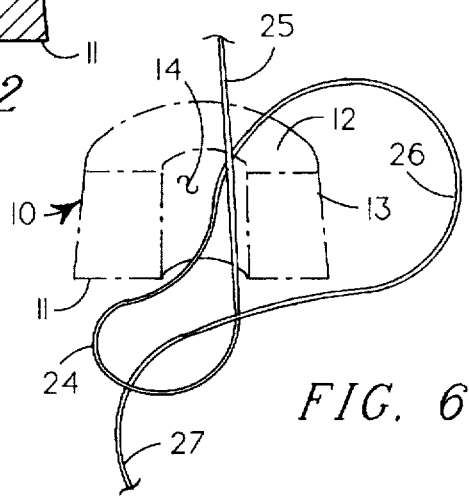
FIG. 6 is a view similar to FIG. 5, but showing a common variation of the knot of FIG. 5 which does leave a knot in a fishing line after sinker disintegration.

A knot by which my sinker may be attached to a flexible line and one which will disappear upon disintegration of the sinker is illustrated in FIG. 5. To form this knot, a loop 24 of fishing line formed by line portions 25 and 26 is passed through cylindrical hole 14 in sinker 10 and the outward end portion 27 of the line is inserted through the loop 24 without crossing over the line portion 25. This knot provides a secure fastening of the sinker to the line, but yet upon disintegration of the sinker forms no knot in the line. The example illustrated in FIG. 6 where the outer portion 26 of the line is passed over the inner portion 25 of that line will form a knot in the fishing line upon disintegration of a sinker fastened in this fashion. This normally is not desirable as the knotted fishing line has appreciably less strength than the same line without the knot. Various known knots other than that of FIG. 5 may accomplish the same purpose, but some knot that provides secure attachment of my sinker and will not result in a knot in a fishing line after disintegration of a sinker should be used.

The foregoing description of my invention is necessarily of a detailed nature so that a specific embodiment of its best known mode might be set forth as required, but it is to be understood that various modifications of detail, rearrangement and multiplication of parts might be resorted to without departing from its spirit, essence or scope.

Having thusly described my invention, what I desire to protect by Letters Patent, and

What I claim is:

1. An annular dissoluble fishing sinker, comprising in combination:

a dried homogeneous mixture of from about 4 to 4.25 parts by volume of minus ten mesh sand; from about 0.25 to 1.33 parts by volume of particulated, water swellable cellulosic material; from about 0.667 to 1.0 parts by volume of wheat flour; and from about 1.5 to 2.667 parts by volume of gelatin solution comprising one-half ounce of dry animal gelatin dissolved in one quart of water.

2. The dissoluble fishing sinker of claim 1 formed as a right truncated cone with a medial axially aligned cylindrical hole extending between a diametrically larger base and a diametrically smaller truncated surface.

3. A dissoluble fishing sinker, configured as a truncated cone defining an axially aligned cylindrical hole extending therethrough, that disintegrates in water after immersion for predetermined times of from about 20 seconds to more than 20 minutes, comprising the air dried homogeneous mixture consisting of:

from 4 to 4.25 parts by volume of sand having a particle size that passes a ten mesh screen but less than one percent passes a 200 mesh screen;

from 2.33 to 4.25 parts by volume of particulate, water swellable cellulosic material of vegetative origin having a size distribution such that all passes a 35 mesh screen but more than 90 percent remains on a 100 mesh screen;

from 1.0 to 4.75 parts by volume of unbleached wheat flour; and from 1.0 to 4.75 parts by volume of gelatin solution comprising one-half ounce of dry animal gelatin dissolved in one quart of water.

* * * * *